US010967416B2

(12) United States Patent
Büllesbach et al.

(10) Patent No.: US 10,967,416 B2
(45) Date of Patent: Apr. 6, 2021

(54) LINEAR CONVEYOR FOR TRANSFERRING WORKPIECES BETWEEN TWO CONSECUTIVE POSITIONS IN A THROUGHPUT DIRECTION

(71) Applicant: Strothmann Machines & Handling GmbH, Schloss Holte-Stukenbrock (DE)

(72) Inventors: Tim Büllesbach, Werther (DE); Bernd Naumann, Erfurt (DE); Andreas Senge, Paderborn (DE)

(73) Assignee: Strothmann Machines & Handling GmbH, Schloss-Holte-Stukenbrock (DE)

( * ) Notice: Subject to any disclaimer, the term of this patent is extended or adjusted under 35 U.S.C. 154(b) by 0 days.

(21) Appl. No.: 16/907,440

(22) Filed: Jun. 22, 2020

(65) Prior Publication Data

US 2021/0016338 A1 Jan. 21, 2021

(30) Foreign Application Priority Data

Jul. 16, 2019 (DE) .......................... 102019119228.5

(51) Int. Cl.
| | |
|---|---|
| *B21D 43/05* | (2006.01) |
| *B65G 41/00* | (2006.01) |
| *B65G 23/28* | (2006.01) |
| *B65G 17/12* | (2006.01) |
| *B65G 47/90* | (2006.01) |
| *B21D 43/10* | (2006.01) |

(52) U.S. Cl.
CPC ........... *B21D 43/105* (2013.01); *B65G 17/12* (2013.01); *B65G 23/28* (2013.01); *B65G 41/003* (2013.01); *B65G 47/901* (2013.01); *B65G 47/905* (2013.01)

(58) Field of Classification Search
CPC .... B21D 43/05; B21D 43/052; B21D 43/055; B21D 43/057; B21D 43/10; B21D 43/11; B65G 41/003; B65G 23/28; B65G 17/12; B65G 47/901; B65G 47/905
See application file for complete search history.

(56) References Cited

U.S. PATENT DOCUMENTS

| | | | |
|---|---|---|---|
| 2007/0137505 A1* | 6/2007 | Heid ...................... | B21D 43/05 100/144 |
| 2009/0078532 A1* | 3/2009 | Reichenbach ......... | B21D 43/05 198/346.2 |

(Continued)

*Primary Examiner* — Mark A Deuble
(74) *Attorney, Agent, or Firm* — Richard M. Goldberg

(57) ABSTRACT

Linear conveyor for transferring workpieces between two consecutive positions in a throughput direction, including at least one axis extending in and linearly displaceable to the throughput direction, and a slide, disposed on and displaceable along each axis, and to which a carrier element for accommodating the workpiece is attached, each axis being telescopic and including a first axis element displaceable relative to the base, and a second axis element displaceable relative to the first axis element, on which slide is displaceably disposed, and a coupling for coupling of displacement movements of the first axis element, second axis element and slide with each other, such that when the first axis element is displaced relative to the base the second axis element is displaced relative to the first axis element and the slide relative to the second axis element in the same direction of displacement.

13 Claims, 5 Drawing Sheets

(56) References Cited

U.S. PATENT DOCUMENTS

| | | | |
|---|---|---|---|
| 2009/0084749 A1* | 4/2009 | Massmann | B65G 47/901 212/312 |
| 2012/0282066 A1* | 11/2012 | Naumann | B25J 15/0052 414/226.05 |
| 2016/0144420 A1* | 5/2016 | Krause | B21D 43/052 198/750.11 |
| 2016/0228937 A1* | 8/2016 | Hagel | B21D 43/05 |

* cited by examiner

LINEAR CONVEYOR FOR TRANSFERRING WORKPIECES BETWEEN TWO CONSECUTIVE POSITIONS IN A THROUGHPUT DIRECTION

BACKGROUND OF THE INVENTION

The present invention relates to a linear conveyor for transferring workpieces between two consecutive positions in a throughput direction according to the preamble of the claims.

Linear conveyors of the type considered here are automation devices for industrial production which are used to transport workpieces in a production line from one processing station to the next, i.e. to transport formed parts between different forming stations for example, to feed to a first forming station in the production line or to unload from a last forming station. Typically, but without limitation, the processing stations or forming stations are presses. The linear conveyor removes the workpiece from a first processing station and transports it to a following station from where it is in turn removed by another linear conveyor and transported onwards.

Such a linear conveyor usually comprises, on each side of the corridor of movement of the workpiece, an axis which extends in the throughput direction, disposed such that it may be linearly displaced along the latter relative to a base. The base may be located on a support of the processing station. Running on the axis there is a slide which accommodates one end of a carrier element disposed at right angles to the throughput direction. Hence the carrier element can extend as a traverse right across the corridor of movement and hold the workpiece by means of grippers or similar. The maximum travel path of the carrier element in, or opposite, the throughput direction is defined by the movement of the axis relative to the base and by the maximum displacement of the slide which travels on the axis, i.e. its maximum achievable distance from the base. The drives for the axis and the slide are usually positively coupled so that when the axis is displaced the slide is automatically moved in the same direction on the axis. This positive coupling may be achieved by, for example, a toothed belt which turns around the axis, which is driven in reaction to movement of the axis and moves the slide with it. This obviates the need for a separate drive for the slide.

To optimise the cycle times of the linear conveyors and the production lines it is desirable to be able to transport the workpieces carried by the linear conveyors in rapid succession. With conventional linear conveyors of the type described above, the convergence of the axes is a highly limiting factor. Due to the positive coupling of the movements of axis and slide, the latter only reaches the end of the axis in the fully extended position. In an incompletely extended position, a relatively long free end section of the axis extends from the slide in the direction of the other axis. When the slides of the linear conveyors converge, there is a risk of collision of their free axis ends. Additional drives to move the slides on the axes may reduce this risk, but entail other disadvantages and limitations. The movement paths of the axes must therefore be carefully coordinated. Exact coordination with the cycle of the production stations is also required. If the total length of the axis exceeds the free distance between the processing stations it is not possible, for example, to move the linear conveyor completely out of the area of movement of the two stations, i.e. to simultaneously close two presses between which the linear conveyor is disposed, for example. All in all, this results in limitations on the output of the production line overall.

SUMMARY OF THE INVENTION

Hence it is a task of the present invention to create a linear conveyor of the type described above which overcomes said problems and permits greater freedom in the coordination of cycle times of the components in a production line, in particular consecutive linear conveyors and corresponding processing stations, so that the output of the production line can be increased overall.

This task is solved according to the invention by a linear conveyor with the features of the claims.

The linear conveyor according to the invention comprises a telescopic axis with at least two axis members which may be displaced relative to each other in the direction of extension of the axis, i.e. in the throughput direction. A first of these axis members may be displaced relative to the base and the second axis member may be displaced relative to the first axis member. The slide on which the carrier element for accommodating the workpiece is mounted, is displaceably disposed on the second axis element.

To achieve positive coupling of the movements of the first axis element, the second axis element and the slide with each other there are coupling means contrived such that when the first axis element moves relative to the base, the second axis element is moved relative to the first axis element and the slide is moved relative to the second axis element in the same direction of displacement. Hence, when the first axis element is moved relative to the base, the slide runs automatically in the direction of the free end of the second axis element.

The telescopic function allows the overall axis to be retracted to a relatively short length which permits the linear conveyor to be positioned entirely inside the free area between two consecutive processing stations. Furthermore, in a not fully extended position, the length of the free end section of the axis not yet traveled by the slide is substantially smaller by virtue of the construction, than is the case with the prior art fixed-length axes.

This in turn allows the slides of two consecutively disposed linear conveyors to be brought far closer together than is the case with conventional linear conveyors with no risk of collision between the two converging free axis ends. In the arrangement according to the invention, the lengths of the workpieces in the throughput direction constitute the limiting factor during convergence, not the length of the extended axes of the linear conveyors. Instead, the ends of the axes may still exhibit a relatively large distance from each other even when the workpieces are brought close together.

As with prior art linear conveyors, a sole drive is all that is required for extending and retracting the axis and for moving the slide in the throughput direction. The telescopic function of the multi-member axis and the coupling means contrived according to the invention ensure that the disadvantages and problems associated with the state of the art are overcome.

The coupling means preferably comprise a first belt which turns at least partially around the first axis element and at least two belt sections running in the opposition direction relative to the throughput direction, of which a first belt section is securely coupled with the base and a second belt section is securely coupled with the second axis member. If the first axis member is moved in the throughput direction relative to the base, the coupling of the first belt section with the base drives the first endless belt, thereby moving the second axis member relative to the first axis element. The first belt may be contrived in one piece as an endless belt, or its ends are joined to form a functional endless belt.

The coupling means preferably also comprise a second belt which turns at least partially around the second axis element and at least two belt sections running running in the opposition direction relative to the throughput direction, of which a first belt section is coupled with the first axis member and a second belt section is coupled with the slide. If the second axis member is set in motion relative to the first axis member, by the first belt for example, as described above, the second belt causes the slide to move relative to the second axis member. Like the first belt, the second belt may be formed in one piece as an endless belt, or its ends may be joined to form a functional endless belt.

The linear conveyor according to the invention preferably comprises a drive for the first axis member comprising a motor installed permanently in the base with a rotating drive shaft and gear means for converting a rotation of the drive shaft into a movement of the axis member. These gear means may comprise a pinion, for example, which is mounted on the rotating drive shaft and engages with a rack extending along the first axis member in the throughput direction.

According to another preferred embodiment of the present invention, the base is mounted in vertically mobile fashion at the side of a permanently installed support.

The linear conveyor according to the invention further preferably comprises a drive for the base, comprising a motor installed permanently in the base with a rotating drive shaft and gear means for converting a rotation of the drive shaft into a vertical movement of the base along the support. In particular, both motors for driving the first axis member and the base respectively may be mounted inside the base, in a common closed or partially open enclosure, for example, and are moved together with it in the vertical direction. The base may be moved upward far enough to allow easy access to the area underneath the linear conveyor for maintenance and retooling purposes.

The drive shafts of the two motors for driving the first axis element and the base respectively are also preferably positioned perpendicular to each other.

The axis is further preferably disposed to one side of the base. This arrangement is particularly advantageous compared to arrangements where the drive is located above or below the axis and hence inside the corridor of movement of the axes and the workpieces to be transported.

According to another preferred embodiment of the present invention the support laterally delimits a corridor of movement of the axis and the base is disposed laterally outside this corridor of movement.

The base is also preferably mounted on the side of the support perpendicular to the side on which the axis is displaceably mounted. The axis is displaceably mounted along an inner side of the support facing the corridor of movement, for example, and the base is displaceably suspended on a side at an angle to it.

Another preferred embodiment of the linear conveyor according to the invention comprises two parallel axes between which the carrier element extends essentially at right angles to the throughput direction. These axes are designed in the manner described above.

The present invention further relates to a production line comprising a first processing station and a second processing station disposed one after the other in the throughput direction and supports between which a corridor of movement extends in the throughput direction, and a linear conveyor of the type according to the invention disposed between the first processing station and the second processing station for transferring workpieces within the corridor of movement between a removal position in the first processing station and a set-down position in the second processing station, wherein at least one base of the linear conveyor is mounted on one of the supports, and the linear conveyor can be moved into a neutral position in which its axis exhibits its shortest length due to retraction of its axis elements and is entirely located in a free section of the corridor of movement between the work areas of the first processing station and the second processing station.

According to another preferred embodiment of the present invention, the production line is a press line, and the processing stations are presses whose press stands form the supports and their press areas form the work areas of the processing stations.

BRIEF DESCRIPTION OF THE DRAWINGS

A preferred embodiment of the present invention will be described in more detail below with reference to the drawings, in which.

DETAILED DESCRIPTION

Figure 1:
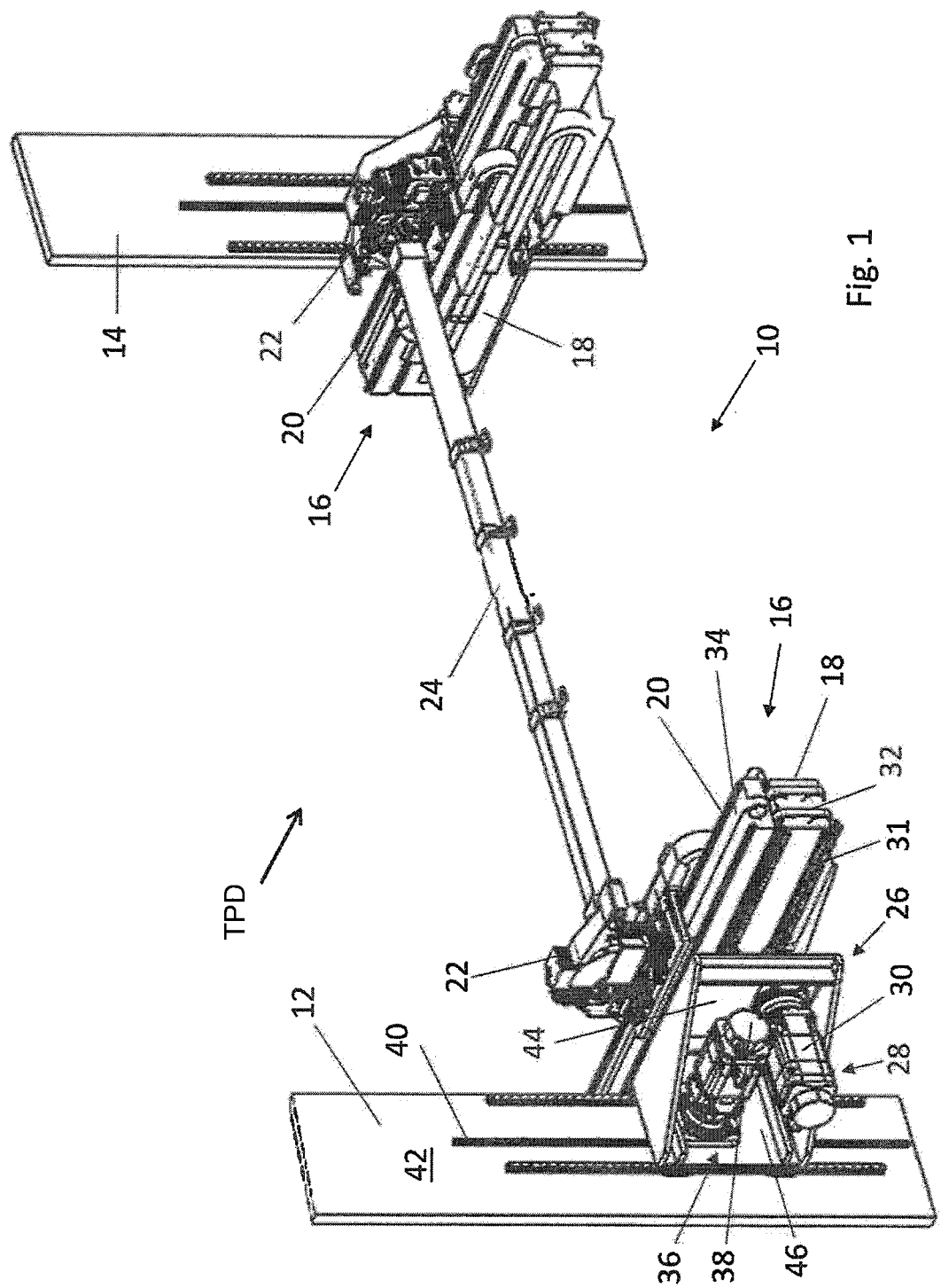
FIG. 1 is a perspective view of an embodiment of the linear conveyor according to the invention.

FIG. 1 shows a linear conveyor 10 for transferring workpieces not shown in more detail between two positions which follow one after the other in a throughput direction TPD (indicated in FIG. 1 by an arrow). These positions are removal positions and set-down positions within processing stations of a production line, such as a press line. The workpieces are moved within a corridor of movement which is delimited laterally, i.e. at right angles to the throughput direction TPD, by two supports 12, 14, which are the press stands of the presses not shown in more detail. Mobile parts of the illustrated linear conveyor 10 also run within this corridor of movement, as shown below.

The linear conveyor 10 comprises, on both sides of the corridor of movement, i.e. on each of supports 12, 14, an axis 16 which extends in the throughput direction TPD and is telescopic. For this purpose, axis 16 comprises several axis elements which may be displaced relative to each other. The present embodiment of axis 16 comprises two axis elements, namely a first axis element 18 and a second axis element 20 which can be moved relative to the first axis element 18. The second axis element 20 rests on the first axis element 18. Resting on the second axis element 20 there is a slide 22 which can be displaced in the throughput direction TPD relative to the second axis element 20 between the ends of this second axis element 20.

The axis 16 with the slide 22 disposed on it on support 14 is essentially functionally identical to the axis 16 on support 12, which is situated laterally opposite support 14, but is assembled mirror-symmetrically. As these components of the linear conveyor 10 are identical in their arrangement and function to those on the first support 12, the same reference numbers will be used here. Thus linear conveyor 10 has, on each of the two supports 12, 14, an axis 16 with the two axis elements 18, 20, and a slide 22 running on it, as described above.

Between slides 22, a carrier element 24 to accommodate the workpiece extends at right angles to the throughput direction TPD. For this purpose, carrier element 24 may be equipped with grippers, suckers or similar not shown in more detail for holding the workpiece, in particular a plate-shaped workpiece, from the top.

The two axes 16 may basically be moved independently of each other on both sides of the corridor of movement, i.e. on each of supports 12, 14. For this purpose the ends of carrier element 24 may be flexibly pivotably suspended in the respective slide 22, and carrier element 24 may be telescopic to compensate for differences in the distance and position of slides 22. Consequently, carrier element 24 need not necessarily extend exactly perpendicular to the throughput direction TPD or exactly horizontally, but rather, depending on the relative position of slides 22 to each other, deviations in the angular position of carrier element 24 are permitted. Further, carrier element 24 may also be displaceable relative to slide 22 along its direction of extension, i.e. essentially at right angles to the throughput direction TPD.

For reasons of simplicity, the following description concentrates on axis 16 and the associated components on the left side in FIG. 1, namely on support 12.

The telescopic axis 16 is horizontally displaceable in linear manner along a base 26, i.e. in and opposite to the throughput direction TPD. In turn, base 26 is mounted on support 12 in vertically displaceable manner. Hence the axis 16 may be moved forwards and backwards in the throughput direction TPD relative to support 12.

For this purpose there is a drive 28 by means of which the first axis element 18 may be linearly displaced relative to base 26. Drive 28 comprises a motor 30 which is permanently installed in base 26 with a rotating drive shaft (not shown). The drive shaft causes (directly or via a gear) a pinion to rotate which engages with a rack 31 which extends laterally along the first axis element 18, i.e. in the throughput direction TPD.

During the above-described movement of the first axis element 18 relative to base 26, slide 22 on the second axis element 20 is simultaneously moved in the same direction. For this purpose the linear conveyor 10 comprises coupling means for positive coupling of the movements of first axis element 18, second axis element 20 and slide 22 with each other. These coupling means comprise belts whose function and arrangement will be described in more detail in FIGS. 2a and 2b.

Figure 2A:
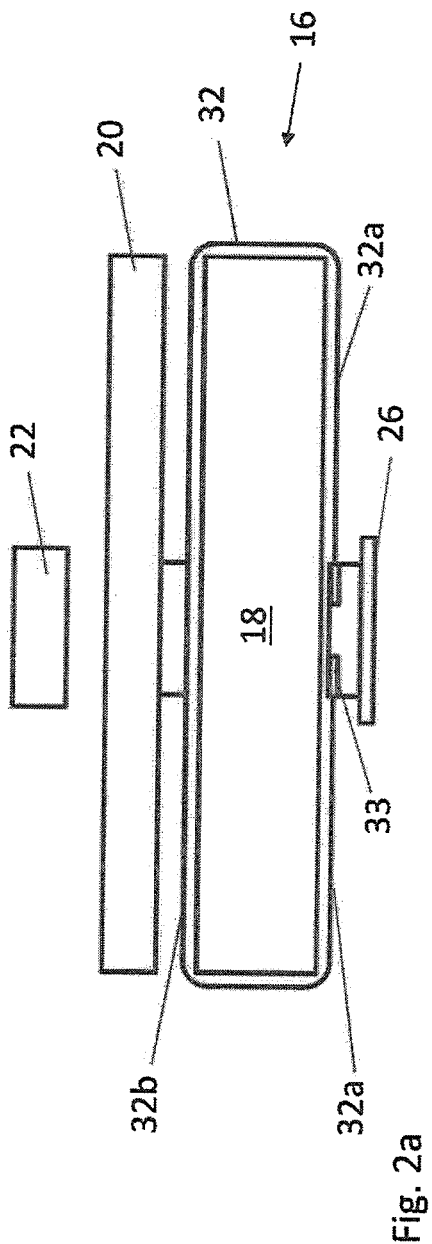
FIGS. 2a, 2b and 2c are diagrammatic views of components of the linear conveyor of FIG. 1 showing the coupling means.
Figure 2B:
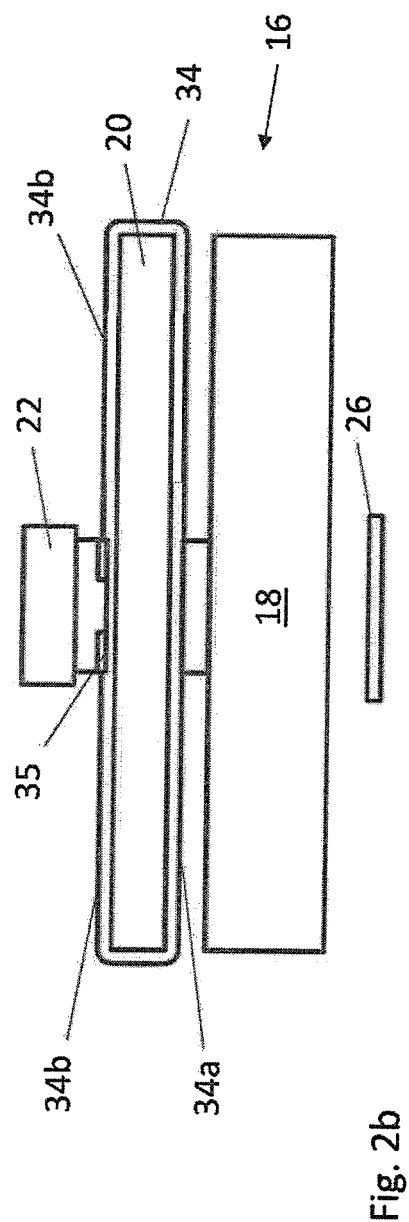

The diagrammatic view in FIGS. 2a and 2b is reduced to parts of base 26, first axis element 18, second axis element 20 and slide 22. FIG. 2a shows a first belt 32 which turns around the first axis element 18 and, on its top side and underside comprises belt sections 32a and 32b running in the opposition direction relative to the throughput direction TPD. Two first belt sections 32a run on the underside of first axis element 18 and a second belt section 32b runs on the top side of first axis element 18. The two first belt sections 32a are connected to each other by means of a clamping piece 33 so that, functionally, the first belt sections 32a and the second belt section 32b, form an endless belt. If the first belt sections 32a move in or opposite to the throughput direction TPD, the second belt section 32b necessarily moves in the opposite direction. First belt sections 32a are securely coupled with base 26 via clamping piece 33, and the second belt section 32b is securely coupled with the second axis element 20. If drive 28 (not shown in FIGS. 2a and 2b) causes the first axis element 18 to make a lateral movement to the right, i.e. approximately in the throughput direction (TPD), the coupling of the second belt section 32b with the second axis element 20 causes the second axis element 20 to be moved in the throughput direction TPD as well, i.e. to the right in FIG. 2a. In other words, due to the first belt 32, movement of the first axis element 18 relative to base 26 necessarily results in movement of the second axis element 20 relative to the first axis element 18. As a result, axis 16 is telescopically extended from the neutral position shown in FIG. 2a, in which axis 16 is retracted and axis elements 18, 20 are positioned exactly on top of each other.

FIG. 2b shows the axis 16 of FIG. 2a with the slide 22 on top of it, including first axis element 18 and second axis element 20. Hence these components are identical to those in FIG. 2a, although first belt 32 is not shown for the sake of simplicity; a second belt 34 which turns around the second axis element 20 is shown instead. It also has a bottom first belt section 34a which is securely coupled to the first axis element 18, and two top second belt sections 34b which are connected to each other via clamping piece 35 so that, functionally, the first belt section 34a and the second belt sections 34b form an endless belt. The second belt sections 34b are securely coupled to slide 22 via clamping piece 35.

This second belt 34 ensures slide 22 is necessarily moved relative to second axis element 20 when second axis element 20 is moved relative to the first axis element 18 as described above with reference to FIG. 2a. If second axis element 20 moves to the right in the throughput direction TPD for example, the coupling of respective belt sections 34a and 34b with first axis element 18 and slide 22 ensures slide 22 necessarily moves along second axis element 20. An additional drive is not required to move slide 22.

The linear displacement of axis 16 overall in the throughput direction TPD, telescopic extension of this axis 16 by a movement of second axis element 20 relative to first axis element 18 and the resultant movement of slide 22 along second axis element 20 are therefore achieved by a single drive 28 on base 26. In a not fully extended position of the slide, a free end section of axis 16 always remains, in particular of second axis element 20, which extends from slide 22 in the direction of displacement. In the construction according to the invention as shown, this free end section of second axis element 20 is substantially shorter than is the case in a prior art construction in which there is a single fixed-length axis element around which a circumferential belt turns, which is securely connected to the base and the slide. As will be shown in the following, it is also possible to dispose the single linear drive for the components shown in FIGS. 2a and 2b outside the corridor of movement in a horizontal direction in a space-saving manner.

Figure 2C:
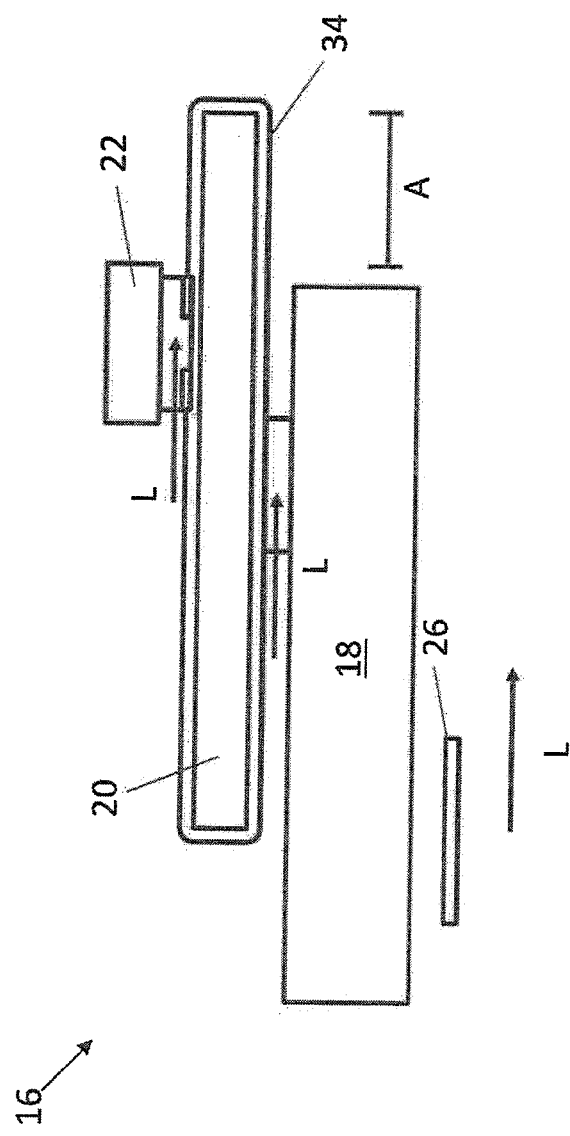

FIG. 2c is a view of axis 16 based on FIG. 2b which serves to explain the displacement path which slide 22 can achieve due to movement of the first axis element 18 relative to base 26 by a distance L. Such a movement leads to a movement of second axis element 20 relative to first axis element 18 by the same distance L, hence the distance of the displacement of the second axis element 20 relative to base 26 is 2L. Further, the positive coupling by means of belt 34 as described above leads to a movement of slide 22 relative to second axis element 20 by the distance L, hence the distance of displacement of slide 22 relative to first axis element 18 is 2L, and 3L relative to the base.

The end result is that a movement of first axis element 18 relative to base 26 is multiplied to a displacement path of slide 22 by the positive coupling within the telescopic configuration. The free section A remaining at the end of second axis element 20 and not yet used as displacement path of slide 22, remains relatively small as a result.

Base 26 itself is vertically displaceable on the respective support 12 (functionally identical execution on support 14). For this purpose there is a drive 36, comprising a motor 38 permanently installed in base 26, with a rotating drive shaft and gear means for converting a rotation of the drive shaft into a vertical movement of base 26 along support 12. In the present case as well, these gear means comprise a pinion which is driven to rotate by the drive shaft and which engages with a rack 40 which extends vertically along support 12. The drive shafts of both motors 30 and 38 for driving first axis element 18 and base 26 respectively are positioned perpendicular to each other.

In FIG. 1 it can be seen that axis 16 is displaceably mounted at the side of base 26. Base 26 is therefore located outside the corridor of movement of axis 16. It is disposed on a side 42 of support 12 which is perpendicular to the side of the support on which axis 16 is displaceably mounted, i.e. perpendicular to the side of the support facing the corridor of movement.

Motors 30, 38 and drives for axis 16 and base 26 are disposed in horizontal and vertical directions in compact, space-saving manner inside base 26. The latter is a half-open enclosure with two enclosure plates positioned perpendicular to each other, of which a first enclosure plate 44 faces axis 16 and through which the drive shaft of motor 30 extends, and a second enclosure plate 46 which abuts flat against side 42 of support 12, through which the drive shaft of motor 38 extends for the purpose of driving base 26. The underside of base 26 extends only slightly deeper than the underside of axis 16.

Base 26 can be moved relatively far up support 12 to provide good accessibility to the area below axis 16 for retooling or maintenance work.

Figure 3:
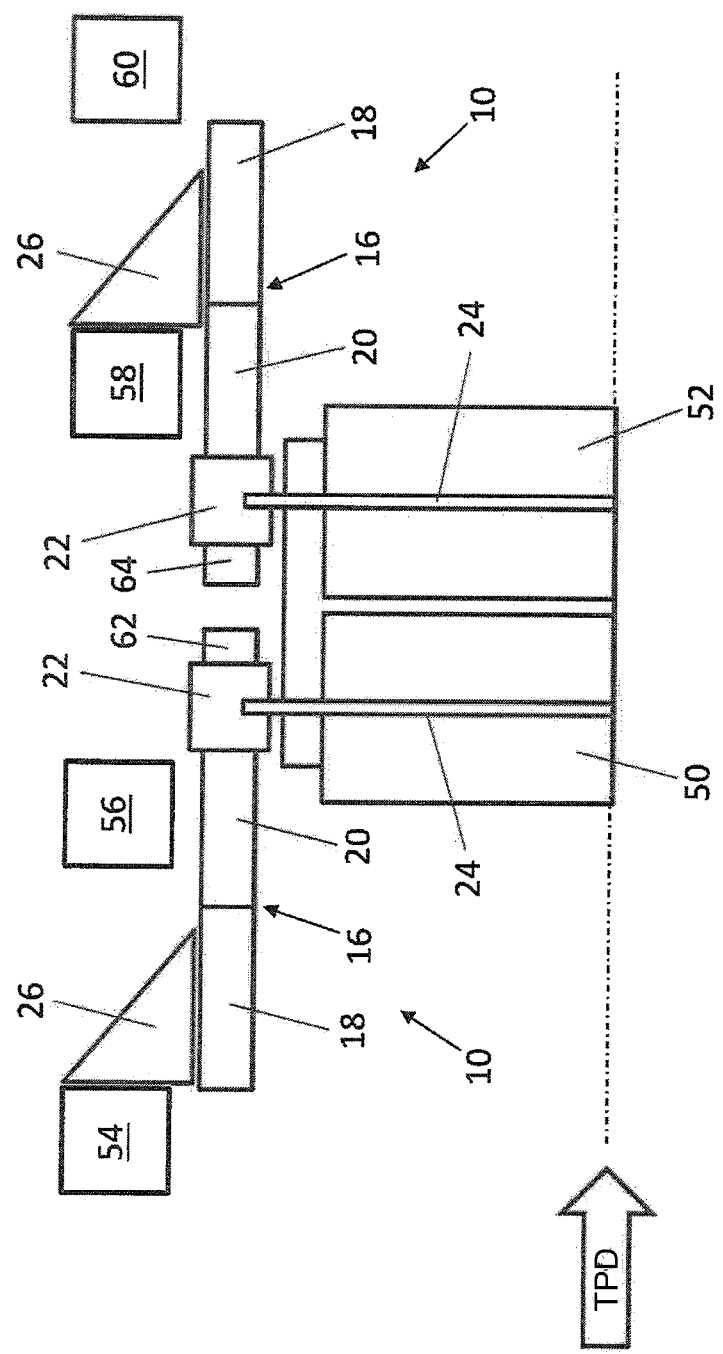
FIG. 3 is a diagrammatic view of the manner of functioning of linear conveyors according to the invention within a press line.

FIG. 3 is a diagrammatic top-plan view of a production line, namely a press line in which two linear conveyors 10 according to the invention are used as described above. FIG. 3 demonstrates that to achieve a minimum distance between two transported plate-shaped workpieces 50, 52, two consecutive linear conveyors 10 have axes 16 which can be moved towards each other with a relatively large distance between them. In other words, the distance between the ends of axes 16 of the two linear conveyors 10 is no longer the limiting factor in the cycle time of linear conveyors 10.

FIG. 3 shows, in the top portion, four supports 54, 56, 58, 60 which are the press stands of a first press and a second press of a press line as an example embodiment of a production line according to the invention. A base 26 of the linear conveyor 10 at left in FIG. 3 is attached to support 54 in vertically displaceable manner and base 26 of the right linear conveyor 10 is disposed on the next-but-one support 58 associated with the second press. The throughput direction TPD extends in FIG. 3 from left to right, so that the left linear conveyor 10 is disposed upstream of the right linear conveyor 10.

FIG. 3 shows the axes 16 of the two linear conveyors 10 in a partially extended state. The upstream linear conveyor 10 has its axis 16 partially extended in the throughput direction TPD so that the second axis element 20 is moved relative to first axis element 18 and slide 22 is moved in the direction of the end of second axis element 20. Axis 16 of the downstream right linear conveyor 10 is also partially extended but in the opposite direction.

Although the two plate-shaped workpieces 50, 52 are only separated by a small distance, a relatively large distance remains between the respective ends 62 and 64 of the extended axes 16 of linear conveyors 10. The cycle time of linear conveyors 10 can therefore be matched to the dimensions and positions of workpieces 50, 52 and is not limited by the positions of the ends of axes 16.

Figure 4:
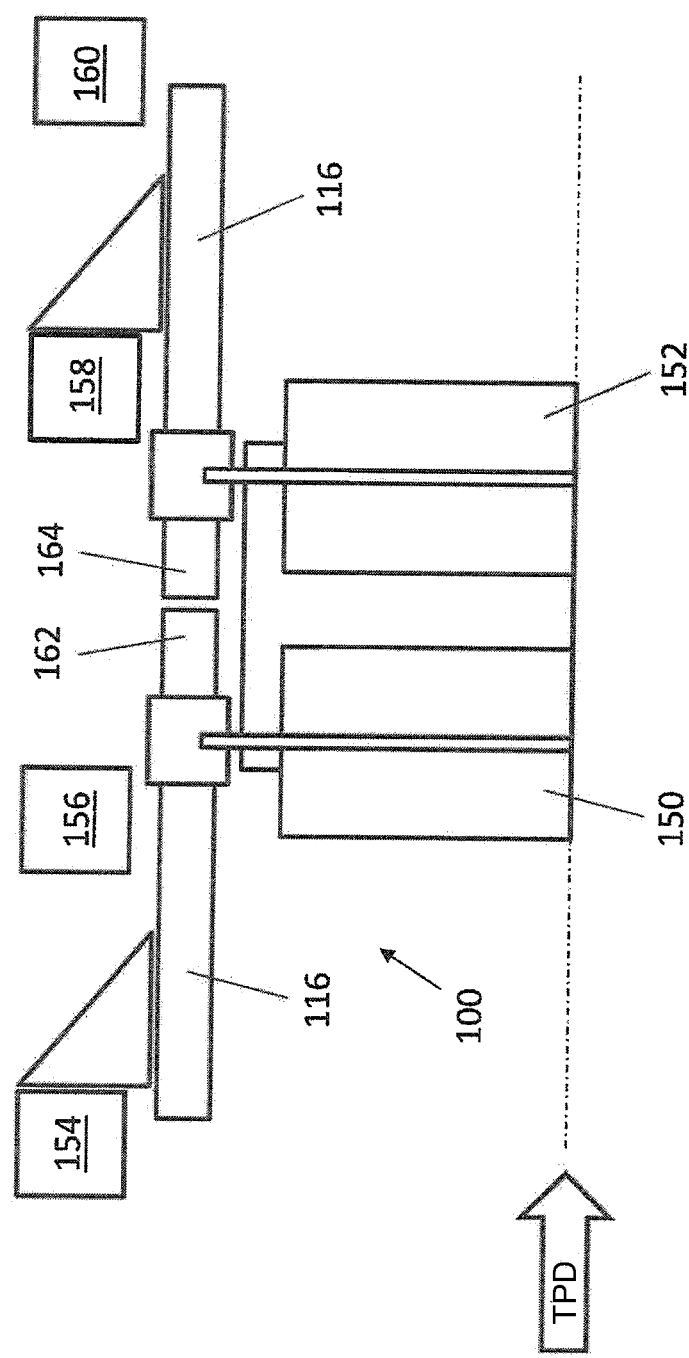
FIG. 4 is a diagrammatic view of a prior art linear conveyor.

FIG. 4 shows, by way of comparison, a prior art production line comprising two conventional linear conveyors 100 arranged on four supports 154, 156, 158, 160 to convey two plate-shaped workpieces 150, 152, in essentially the same way as in FIG. 3. In contrast to the present invention, the axes 116 of the conventional linear conveyors 100 are not telescopic, i.e. their length cannot be varied. The smallest achievable distance between two transported plate-shaped workpieces 150. 152 is limited by the convergence of the ends 162 and 164 of axes 116, not by the dimensions and positions of workpieces 150, 152, as is the case according to the invention.

What is claimed is:

1. Linear conveyor for transferring workpieces between two consecutive positions in a throughput direction, comprising:
    at least one axis, each of which extends in the throughput direction and is disposed such that it may be linearly displaced along the throughput direction relative to a base,
    a slide which may be displaced on and along each axis,
    a carrier element attached to each slide for accommodating one said workpiece,
    wherein each axis is telescopic and comprises at least two axis elements which may be displaced relative to each other in the direction of extension of the respective axis, with the at least two axis elements including a first axis element which is displaceable relative to the base, and a second axis element which is displaceable relative to the first axis element and on which the slide is displaceably disposed, and
    a coupling for positive coupling of movements of the first axis element, second axis element and slide with each other, constructed in such a way that when the first axis element is moved relative to the base the second axis element is moved relative to first axis element and the slide is moved relative to the second axis element in the same direction of displacement.

2. Linear conveyor according to claim 1, wherein the coupling comprises a first belt which turns at least partially around the first axis element and which includes at least two belt sections running opposite to the throughput direction, of which a first belt section is coupled with the base and a second belt section is coupled with the second axis element.

3. Linear conveyor according to claim 1, wherein the coupling comprises a second belt which turns at least partially around the second axis element and which includes at least two belt sections running opposite to the throughput direction, of which a first belt section is coupled with the first axis element and a second belt section is coupled with the slide.

4. Linear conveyor according to claim 1, further comprising a drive for the first axis element, the drive comprising a motor fixed permanently in the base and including a rotating drive shaft engageable with a gear to convert a rotation of the drive shaft into a displacement movement of first axis element.

5. Linear conveyor according to claim 1, wherein the base is attached at a side of a permanently installed support such that it may be displaced vertically.

6. Linear conveyor according to claim 5, further comprising a drive for the base, the drive comprising a motor installed permanently in the base and including a rotating drive shaft engageable with a gear for converting a rotation of the drive shaft into a vertical displacement of the base along the support.

7. Linear conveyor according to claim 6, further comprising a drive for the first axis element, the drive comprising a motor fixed permanently in the base and including a rotating drive shaft engageable with a gear to convert a rotation of the drive shaft into a displacement movement of first axis element, and the drive shafts of the two motors are disposed perpendicular to each other to drive the first axis element and base respectively.

8. Linear conveyor according to claim 1, wherein each axis is displaceably mounted at the side of the respective base.

9. Linear conveyor according to claim 7, wherein each axis is displaceably mounted at the side of the respective base, and wherein the support laterally delimits a corridor of movement of each axis, and wherein each base is laterally disposed outside this corridor of movement.

10. Linear conveyor according to claim 9, wherein each base is disposed on a side of the support which is positioned perpendicular to the side on which the respective axis is displaceably mounted.

11. Linear conveyor according to claim 1, wherein there are two parallel ones of said axes between which the carrier element extends essentially at right angles to the throughput direction.

12. Production line of the type including a first processing station and a second processing station disposed behind each other in a throughput direction and the production line comprising:

supports between which a corridor of movement extends in the throughput direction, and a linear conveyor according to claim 1 disposed between the first processing station and the second processing station for transferring workpieces inside the corridor of movement between a removal position in the first processing station and a set-down position in the second processing station, wherein at least one base of the linear conveyor is mounted on one of supports, and the linear conveyor is adapted to be moved into a neutral position in which its axis exhibits a shortest length by retracting its axis elements and is located entirely inside a free section of the corridor of movement between work areas of the first processing station and the second processing station.

13. Production line according to claim 12, wherein the production line is a press line and the processing stations are presses having press stands which form the supports and press areas thereof form the work areas of the processing stations.

* * * * *